(12) United States Patent
Yamamoto et al.

(10) Patent No.: US 9,534,354 B2
(45) Date of Patent: Jan. 3, 2017

(54) CONSTRUCTION MACHINE

(71) Applicant: Hitachi Construction Machinery Co., Ltd., Bunkyo-ku, Tokyo (JP)

(72) Inventors: Daisuke Yamamoto, Koka (JP); Yohei Iwamoto, Koka (JP); Hiroshi Tabeta, Konan (JP); Osamu Kokuryo, Koka (JP); Junya Kawamoto, Moriyama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/213,011

(22) Filed: Jul. 18, 2016

(65) Prior Publication Data
US 2016/0326716 A1 Nov. 10, 2016

Related U.S. Application Data

(63) Continuation of application No. 14/600,100, filed on Jan. 20, 2015.

(30) Foreign Application Priority Data

Jan. 24, 2014 (JP) .................................. 2014-011775
Jan. 24, 2014 (JP) .................................. 2014-011777

(51) Int. Cl.
*B62D 55/00* (2006.01)
*E02F 9/02* (2006.01)
(Continued)

(52) U.S. Cl.
CPC ............... *E02F 9/024* (2013.01); *B62D 55/06* (2013.01); *B62D 55/084* (2013.01); *E02F 9/16* (2013.01); *E02F 9/2004* (2013.01)

(58) Field of Classification Search
CPC ........ B62D 55/084; G05G 5/005; G05G 5/02; G05G 5/00
(Continued)

(56) References Cited

U.S. PATENT DOCUMENTS 1,448,105 A 3/1923 Bell
2,035,858 A 3/1936 Bauer et al.
(Continued)

FOREIGN PATENT DOCUMENTS

EP 1 442 968 A1 8/2004
FR 2084808 12/1971
(Continued)

OTHER PUBLICATIONS

European Search Report issued in counterpart European Application No. 15151226.6 dated Nov. 19, 2015 (seven (7) pages).
(Continued)

*Primary Examiner* — Joseph Rocca
*Assistant Examiner* — Conan Duda
(74) *Attorney, Agent, or Firm* — Crowell & Moring LLP

(57) ABSTRACT

Disclosed is a construction machine that enables an operator to operate a vehicle width changing control lever while visually confirming positions of crawlers. The construction machine includes a lower track structure 1 whose left and right crawler track devices 11A and 11B are adapted to change in spatial interval, and an upper swing structure 2 swingably mounted above the lower track structure. The construction machine further includes a hydraulically actuated cylinder for changing vehicle width, disposed between the left and right crawler track devices, the vehicle width changing cylinder changing the interval between the left and right crawler track devices upon supply and discharge of a hydraulic fluid being controlled by a vehicle width changing control valve, and a vehicle width changing control lever 34 disposed on a left section of a swing body support structure 50 relative to an operator's seat 23, the vehicle width changing control lever operating the vehicle width changing control valve.

6 Claims, 17 Drawing Sheets

(51) Int. Cl.
*E02F 9/16* (2006.01)
*E02F 9/20* (2006.01)
*B62D 55/06* (2006.01)
*B62D 55/084* (2006.01)

(58) Field of Classification Search
USPC .......................................... 305/127, 131, 134
See application file for complete search history.

(56) References Cited

U.S. PATENT DOCUMENTS

| | | | |
|---|---|---|---|
| 2,618,349 A | 11/1952 | Ludema | |
| 2,634,663 A | 4/1953 | Curtis | |
| 2,763,330 A | 9/1956 | Potter | |
| 3,037,571 A | 6/1962 | Zelle | |
| 3,205,961 A | 9/1965 | Nolte | |
| 3,312,291 A | 4/1967 | Haug | |
| 3,385,014 A | 5/1968 | Haug | |
| 3,393,758 A | 7/1968 | Helm et al. | |
| 3,416,622 A | 12/1968 | Helm et al. | |
| 3,680,720 A | 8/1972 | Strange | |
| 3,700,115 A | 10/1972 | Johnson et al. | |
| 3,712,398 A | 1/1973 | Althaus | |
| 3,749,193 A | 7/1973 | Blase et al. | |
| 3,757,881 A | 9/1973 | Short et al. | |
| 3,820,616 A | 6/1974 | Juergens | |
| 3,863,988 A | 2/1975 | Bartels | |
| 3,894,598 A | 7/1975 | Yeou | |
| 3,990,529 A | 11/1976 | Bartels | |
| 4,000,784 A | 1/1977 | Morrow, Sr. et al. | |
| 4,036,077 A | 7/1977 | Akiyama | |
| 4,077,276 A | 3/1978 | Knox, Jr. | |
| 4,132,317 A | 1/1979 | Arendt et al. | |
| 4,183,257 A * | 1/1980 | Lovenduski ........... G05G 5/005 74/473.21 | |
| 4,297,914 A | 11/1981 | Klem et al. | |
| 4,297,915 A | 11/1981 | Klem | |
| 4,310,078 A | 1/1982 | Shore | |
| 4,341,276 A | 7/1982 | Furuichi | |
| 4,358,965 A | 11/1982 | Schroeder | |
| 4,386,673 A | 6/1983 | Carter et al. | |
| 4,457,388 A | 7/1984 | Koehler et al. | |
| 4,548,094 A | 10/1985 | Huitema et al. | |
| 4,887,483 A | 12/1989 | Vollath | |
| 5,293,949 A | 3/1994 | Zimmermann | |
| 5,446,982 A | 9/1995 | Blaszynski | |
| 5,451,135 A | 9/1995 | Schempf et al. | |
| 5,551,265 A | 9/1996 | Garman et al. | |
| 5,598,896 A | 2/1997 | Haest | |
| 5,638,908 A | 6/1997 | Masumoto et al. | |
| 6,145,610 A | 11/2000 | Gallignani | |
| 6,176,334 B1 | 1/2001 | Lorenzen | |
| 6,318,484 B2 | 11/2001 | Lykken et al. | |
| 6,374,933 B1 | 4/2002 | Ruppert, Jr. et al. | |
| 6,394,204 B1 | 5/2002 | Haringer | |
| 6,851,494 B2 | 2/2005 | Harthauser | |
| 7,373,999 B2 | 5/2008 | Haringer | |
| 7,481,289 B2 | 1/2009 | Ueda et al. | |
| 7,588,106 B2 | 9/2009 | Koskinen | |
| 7,992,660 B2 | 8/2011 | Ishii | |
| 8,230,757 B2 | 7/2012 | Nocko et al. | |
| 8,403,099 B2 | 3/2013 | Yokota | |
| 8,985,252 B2 | 3/2015 | Otto et al. | |
| 9,033,071 B2 | 5/2015 | Koga et al. | |
| 9,132,870 B2 | 9/2015 | Smith et al. | |
| 2002/0157284 A1* | 10/2002 | Tamaru ..................... E02F 9/16 37/348 | |
| 2002/0195284 A1* | 12/2002 | Law ......................... B62D 1/12 180/6.66 | |
| 2009/0223191 A1* | 9/2009 | Wilson ................. A01D 34/824 56/11.7 | |
| 2009/0229894 A1 | 9/2009 | Roucka | |
| 2010/0192551 A1 | 8/2010 | Yokota | |
| 2011/0072933 A1 | 3/2011 | Boyce | |
| 2014/0020963 A1 | 1/2014 | Smith et al. | |
| 2014/0284119 A1 | 9/2014 | Koga et al. | |

FOREIGN PATENT DOCUMENTS

| | | |
|---|---|---|
| GB | 2504135 A | 1/2014 |
| JP | 62-182837 U | 11/1987 |
| JP | 1-162874 U | 11/1989 |
| JP | 4-37654 U | 3/1992 |
| JP | 5-56563 U | 7/1993 |
| JP | 8-80104 A | 3/1996 |
| JP | 2000-198471 A | 7/2000 |
| JP | 2001-347848 A | 12/2001 |
| JP | 2004-175370 A | 6/2004 |
| JP | 2008-42771 A | 2/2008 |
| JP | 2008-260333 A | 10/2008 |
| JP | 2009-221775 A | 10/2009 |
| JP | 2010-42699 A | 2/2010 |
| WO | WO 2010/069393 A1 | 6/2010 |

OTHER PUBLICATIONS

Japanese-language Office Action issued in counterpart Japanese Application No. 2014-011777 dated Feb. 9, 2016 (Three (3) pages).
Japanese Office Action issued in counterpart Japanese Application No. 2014-011775 dated Jan. 19, 2016 (three pages).

* cited by examiner

CONSTRUCTION MACHINE

CROSS REFERENCE TO RELATED APPLICATIONS

This application is a divisional of U.S. application Ser. No. 14/600,100, filed Jan. 20, 2015, which claims priority from Japanese Patent Application Nos. 2014-011777, filed Jan. 24, 2014 and 2014-011775, filed Jan. 24, 2014, the disclosures of which are expressly incorporated by reference herein.

BACKGROUND OF THE INVENTION

1. Field of the Invention

The present invention relates generally to construction machines of a crawler type, and more particularly, to construction machines in which spatial interval between respective left and right crawler track devices can be varied.

2. Description of the Related Art

Some compact hydraulic excavators are equipped with a vehicle width changer. Such a vehicle width changer enables width of the vehicle or a spatial interval between left and right crawler track devices of the vehicle to be extended for improved traveling stability and enhanced excavating stability of the vehicle body. The vehicle width changer also enables the vehicle width to be narrowed down for traveling through confined spaces such as an alley, or for being loaded and carried on mini-trucks.

For example, operating means for a vehicle width changer is already placed in practical use. In such operating means, a blade-lifting lever disposed to the right of an operator cab also serves as a vehicle width changing control lever, with switching between the two lever functions being conducted by switching the solenoid valve using an operator switch. Another known example includes, as described in JP-2000-198471-A, a control lever (hereinafter, referred to as a vehicle width changing control lever) on a front side of a seat base under an operator's seat.

SUMMARY OF THE INVENTION

Unlike standard machines of a large machine-body tail radius, hydraulic excavators small in vehicle body and having a small machine-body tail radius usually have a fuel tank and a hydraulic fluid tank arranged on a front right side of the machine body because of a limited space for device mounting (hereinafter, such a hydraulic excavator is referred to as a rear ultrasmall-swing machine). This is likely to reduce visibility of the machine undercarriage (crawlers) as viewed from the right side of an operator's seat.

For example, if a rear ultrasmall-swing machine has such a function that a blade-lifting lever disposed to the right of an operator cab also serves as a vehicle width changing control lever, the operator has difficulty visually confirming the positions of the crawlers while operating the vehicle width changing control lever, and hence has some trouble in adjusting the vehicle width.

Substantially the same also applies to the hydraulic excavator described in JP-2000-198471-A. That is to say, since an operator would need to bend forward to operate the vehicle width changing control lever disposed on the front side of the seat base under the operator's seat, the operator has difficulty visually confirming positions of crawlers and hence has some trouble in adjusting the vehicle width.

The present invention has been made with the above problems in mind, and an object of the invention is to provide a construction machine constructed to enable an operator to operate a vehicle width changing control lever while visually confirming positions of crawlers.

(1) In order to solve the above problems, a construction machine according to an aspect of the present invention includes a lower track structure whose left and right crawler track devices are adapted to change in spatial interval, and an upper swing structure swingably mounted above the lower track structure, the upper swing structure including: a swing frame that forms a support structure; a counterweight disposed at a rear section of the swing frame; a seat base supported by the swing frame, disposed at a front side of the counterweight, and forming a swing body support structure in combination with the swing frame; an operator's seat placed on the seat base; and a floor panel positioned at a front side of the seat base and the operator's seat and forming an operator's accessway; the construction machine further including a hydraulically actuated cylinder for changing vehicle width, disposed between the left and right crawler track devices, the vehicle width changing cylinder changing the interval between the left and right crawler track devices upon supply and discharge of a hydraulic fluid being controlled by a vehicle width changing control valve, and a vehicle width changing control lever disposed on a left section of the swing body support structure relative to the operator's seat, the vehicle width changing control lever operating the vehicle width changing control valve.

In the present invention of this configuration, since the vehicle width changing control lever is disposed on the section of the swing body support structure that is located to the left of the operator's seat, even when the construction machine is restricted in visibility of the machine undercarriage (crawlers) as with a rear ultrasmall-swing machine, an operator can operate the vehicle width changing control lever while visually confirming the positions of the crawlers, by taking a look at a readily visible section of the swing body support structure that is located to the left of the operator's seat. This facilitates the adjustment of the vehicle width.

(2) Preferably the construction machine in above item (1) further includes a control lever device disposed on a front left section of the seat base relative to the operator's seat; wherein the vehicle width changing control lever is disposed at a rear section of the control lever device on the seat base and adapted to tilt back and forth.

Thus, even when the control lever device is arranged on the front left section of the seat base relative to the operator's seat, the vehicle width changing control lever can be disposed on the section of the swing body support structure that is located to the left of the operator's seat, so that as outlined in item (1) above, the operator can operate the vehicle width changing control lever while visually confirming the positions of the crawlers and can thus readily adjust the vehicle width.

(3) In above item (1) or (2), the vehicle width changing control lever preferably includes a lever section mounted on the swing body support structure and adapted to tilt back and forth, and a grip section mounted at a distal end of the lever section; wherein the lever section is bent backward at the distal end where the grip section is mounted.

Thus, even when the construction machine is designed to have an extremely small swing radius as with a rear ultrasmall-swing machine, and the vehicle width changing control lever is surrounded with a control lever device or any other parts restricting a zone in which the vehicle width changing control lever is adapted to move, the operator's hand gripping the grip section during tilting operations on the vehicle width changing control lever neither oversteps the swing radius nor interferes with the surrounding parts, which leads to improved operability of the vehicle width changing control lever.

(4) Preferably the construction machine in item (1) further includes a lever locking device that locks the vehicle width changing control lever at its neutral position; wherein the vehicle width changing control lever includes a lever section tiltably mounted on the swing body support structure, and a grip section mounted at an upper end of the lever section; the swing body support structure includes an upper panel at where the vehicle width changing control lever is disposed, the upper panel being formed with an elongated lever hole into which the lever section is inserted and encompassing a region in which the vehicle width changing control lever is adapted to move; the lever locking device includes a movable plate mounted on the upper panel via a hinge and adapted to turn between a horizontally tilted position and a raised position, the movable plate being formed with a notched recess at an edge opposite to the hinge; and the movable plate, when in the horizontally tilted position, locks the lever section by covering the lever hole and engaging the lever section in the notched recess, and when in the raised position, unlocks the lever section by uncovering the lever hole and releasing the lever section from the notched recess.

Thus, during normal work not requiring the operation of the vehicle width changing control lever, accidental operations on the vehicle width changing control lever can be prevented by locking this lever with the lever locking device.

In addition, when the vehicle width changing control lever is locked, the lever hole can be covered by use of the movable plate, hot air inside the engine compartment can be prevented from blowing out from the lever hole, and furthermore, rainwater and the like can be prevented from entering the engine compartment from the lever hole. These characteristics are beneficial for maintaining the operator's seat and periphery in a favorable seating environment, and for maintaining a favorable operating environment for the devices placed in the engine compartment.

(5) Preferably the lever locking device outlined in above item (4) further includes, at the edge of the movable plate where the notched recess is formed, a holding section disposed so as to rise from the movable plate.

This enables the movable plate to be turned via the holding section, and the operator to lock and unlock the vehicle width changing control lever smoothly.

(6) Preferably the lever locking device outlined in above item (4) or (5) further includes a flexible, plate-shaped sealing member on a face of the movable plate, the face adapted to face the lever hole.

This enables a clearance between the movable plate and an outer edge of the lever hole to be filled in with the sealing member when the vehicle width changing control lever is locked. In addition, hot air inside the engine compartment can be more reliably prevented from blowing out from the lever hole, and furthermore, rainwater and the like can be more reliably prevented from entering the engine compartment from the lever hole. These characteristics are beneficial for maintaining the operator's seat and periphery in a favorable seating environment, and for maintaining a favorable operating environment for the devices placed in the engine compartment.

In the present invention, it is easy to adjust the vehicle width because the vehicle width changing control lever can be operated while visually confirming the positions of the crawlers.

DESCRIPTION OF THE PREFERRED EMBODIMENT

A compact hydraulic excavator (e.g., a rear ultrasmall-swing machine), taken as an example of a construction machine according to an embodiment of the present invention, is described below referring to the accompanying drawings. The words "front," "rear," "left," and "right" in the present embodiment mean directions or positions of the machine elements as viewed from an operator seated on an operator's seat.

Configuration

Figure 1:
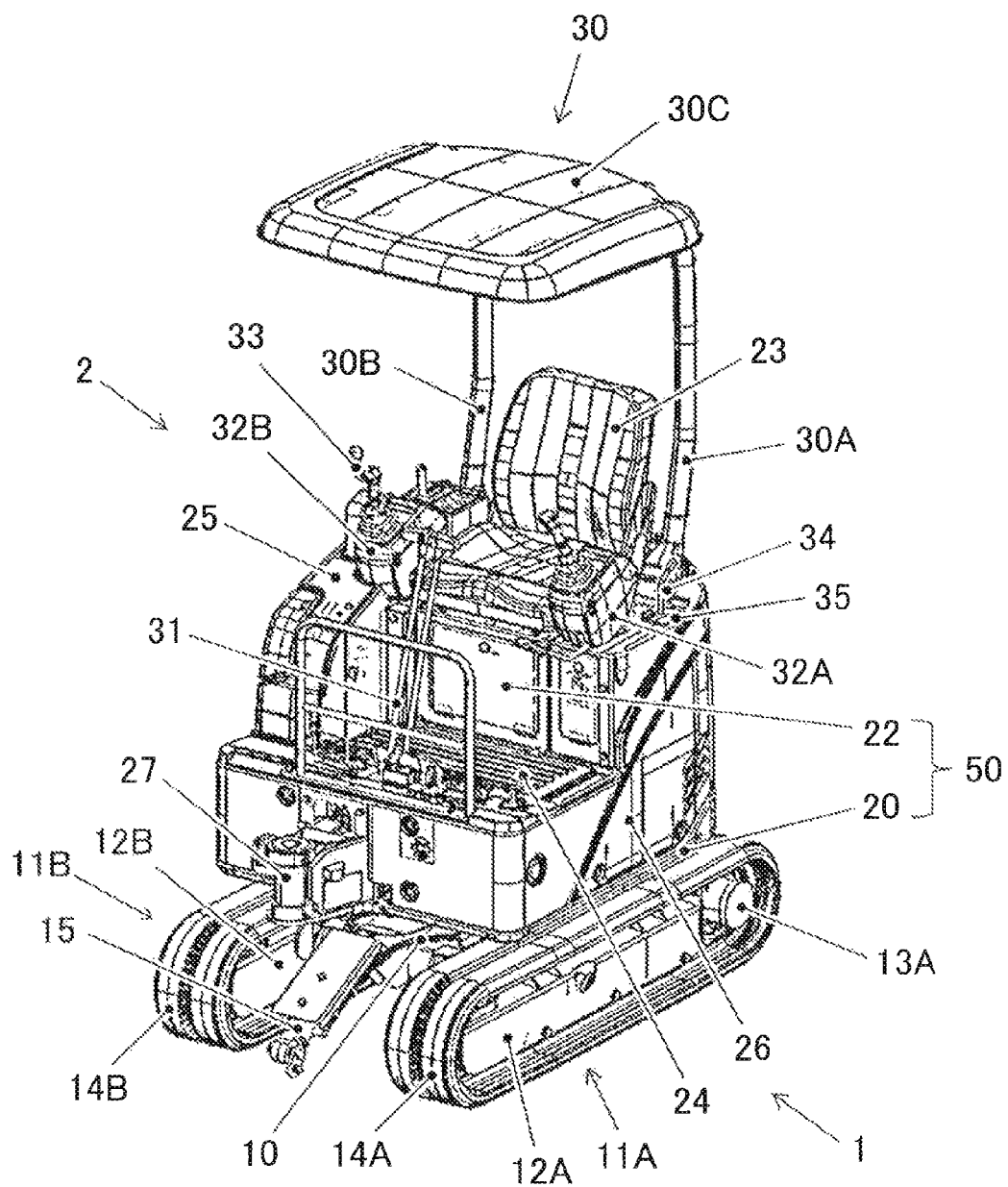
FIG. 1 is a perspective view of a hydraulic excavator according to an embodiment of the present invention, with a work implement and a blade being omitted from the figure.

FIG. 1 is a perspective view of the hydraulic excavator according to the present embodiment, with a work implement and a blade omitted. The hydraulic excavator includes a lower track structure 1, an upper swing structure 2 swingably mounted above the lower track structure 1, and the work implement (not shown) that is disposed in front of the upper swing structure 2.

The lower track structure 1 includes left and right crawler track devices 11A and 11B (hereinafter, referred to simply as the track devices), and a center frame 10 coupling the left and right track devices 11A and 11B to one another and supporting the upper swing structure 2. The left track device 11A includes a left sideframe 12A, a left track motor 13A, and a left crawler 14A wound around the left sideframe 12A and the left track motor 13A, and the right track device 11B includes a right sideframe 12B, a right track motor (not shown), and a right crawler 14B wound around the right sideframe 12B and the right track motor (not shown). An earth moving device including, for example, a blade lifting cylinder 15 and a blade (not shown) that is lifted up and down by the blade lifting cylinder 15, is fitted on a front section of the center frame 10.

The upper swing structure 2 includes a swing frame 20 that is a base support structure, a counterweight 21 (see FIG. 2) that is provided on a rear section of the swing frame 20, a seat base 22 positioned in front of the counterweight 21 and supported by the swing frame 20, an operator's seat 23 placed on the seat base 22, and a floor panel 24 positioned at a front section of the seat base 22 and the operator's seat 23 and forming an operator's accessway. The swing frame 20 and the seat base 22 constitute a swing body support structure 50 on which to mount those devices and parts, including the counterweight 21 and the operator's seat 23, that are needed for operating the hydraulic excavator, and devices described later herein, such as an engine and a hydraulic pump, are mounted at rear of the swing frame 20. The seat base 22 also functions as an engine cover to shroud the engine, the hydraulic pump, and other devices. At a front right section of the swing frame 20 are mounted a hydraulic fluid tank and a fuel tank (neither shown), which are shrouded with a tank cover 25. The swing body support structure has its outer periphery shrouded with an outer cover 26.

At a front section of the swing frame 20 is also disposed a support bracket 27, from which the swing-post work implement (not shown) is mounted so as to be horizontally swingable. A track lever and pedal device 31 for operating the left and right track devices 11A and 11B is disposed at a front section of the floor panel 24. Left and right control lever devices 32A and 32B for controlling operation of the work implement (not shown) and that of a swing device 40 (see FIG. 2), are arranged to the left and right, respectively, of the operator's seat 23 on the seat base 22 (i.e., on upper panels 22b1 and 22c1 of left and right seatbase portions described later herein). At a further right section of the right control lever device 32B on the seat base 22 is disposed a blade-lifting lever 33 for moving vertically the blade (not shown) that is fitted on the front section of the center frame 10. The upper swing structure 2 also includes a twin-pillar canopy 30, which has left and right pillars 30A and 30B set up at rear of the swing body support structure 50, and a roof 30C mounted at upper ends of the left and right pillars 30A and 30B.

One feature of the present embodiment is that a vehicle width changing control lever 34 for changing a spatial interval between the left and right crawlers 14A and 14B (this interval is hereinafter referred to as the vehicle width) is disposed between the left control lever device 32A and the left pillar 30A, that is, at a rear section of the left control lever device 32A that is a left section of the seat base 22 relative to the operator's seat 23 (on the upper panel 22b1 of the left seatbase portion 22b detailed later herein). Another feature is that a lever locking device 35 that locks the vehicle width changing control lever 34 at its neutral position of this lever is provided at an edge of a lever hole for the lever 34.

Figure 2:
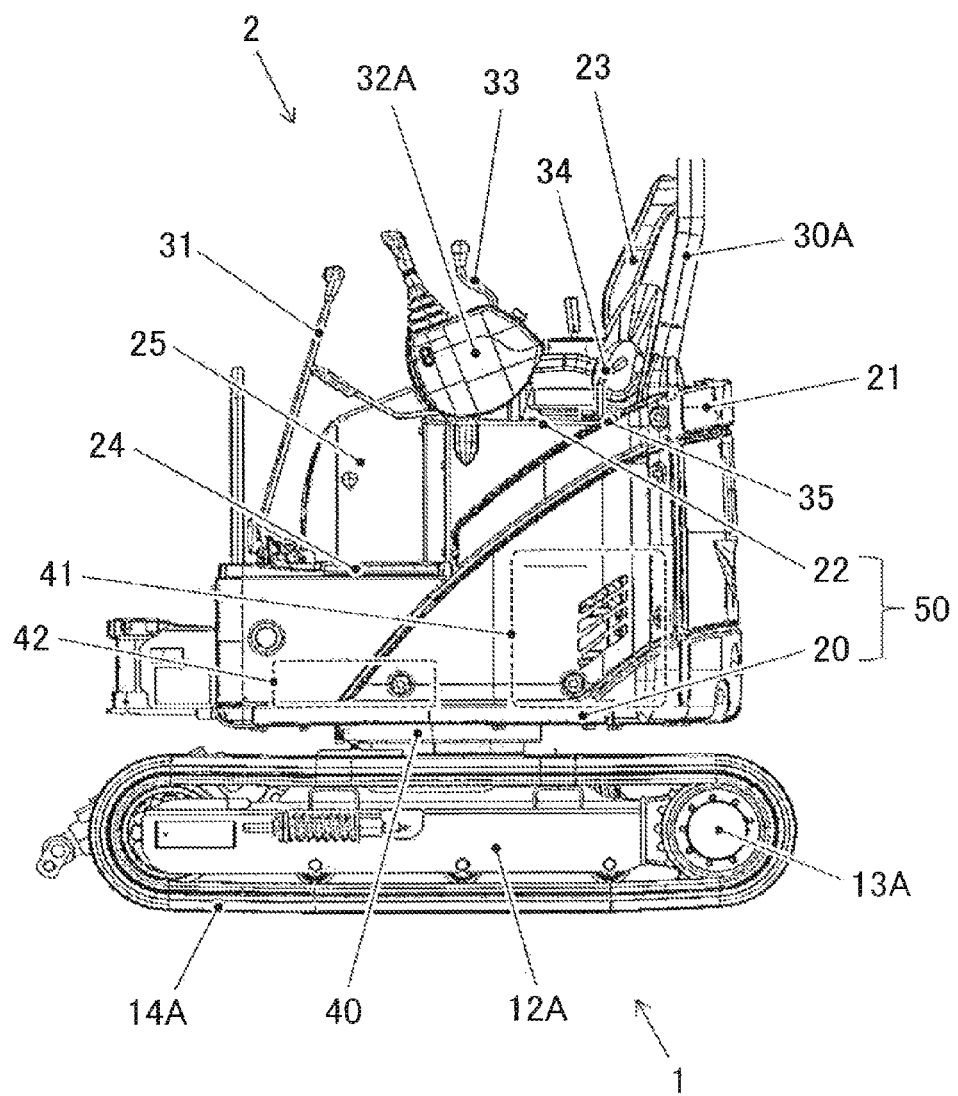
FIG. 2 is a side view of the hydraulic excavator, with the work implement, the blade, and a roof of a canopy omitted.

FIG. 2 is a side view of the hydraulic excavator, with the work implement, the blade, and the roof of the canopy omitted. The swing device 40, driven by a swinging hydraulic motor to drive the upper swing structure 2 to swing with respect to the lower track structure 1, is disposed at the central section of the swing frame 20. An engine 41 (shown with a dotted line in the figure) as a prime mover, and the hydraulic pump (not shown) that is driven by the engine 41 are mounted at the rear section of the swing frame 20, under the seat base 22. A control valve unit 42 (also shown with a dotted line in the figure) that controls directions and flow rates of the hydraulic fluid supplied from the hydraulic pump to a plurality of actuators including the track motor 13A is disposed at a left front section of the swing frame 20, under the floor panel 24.

Figure 3:
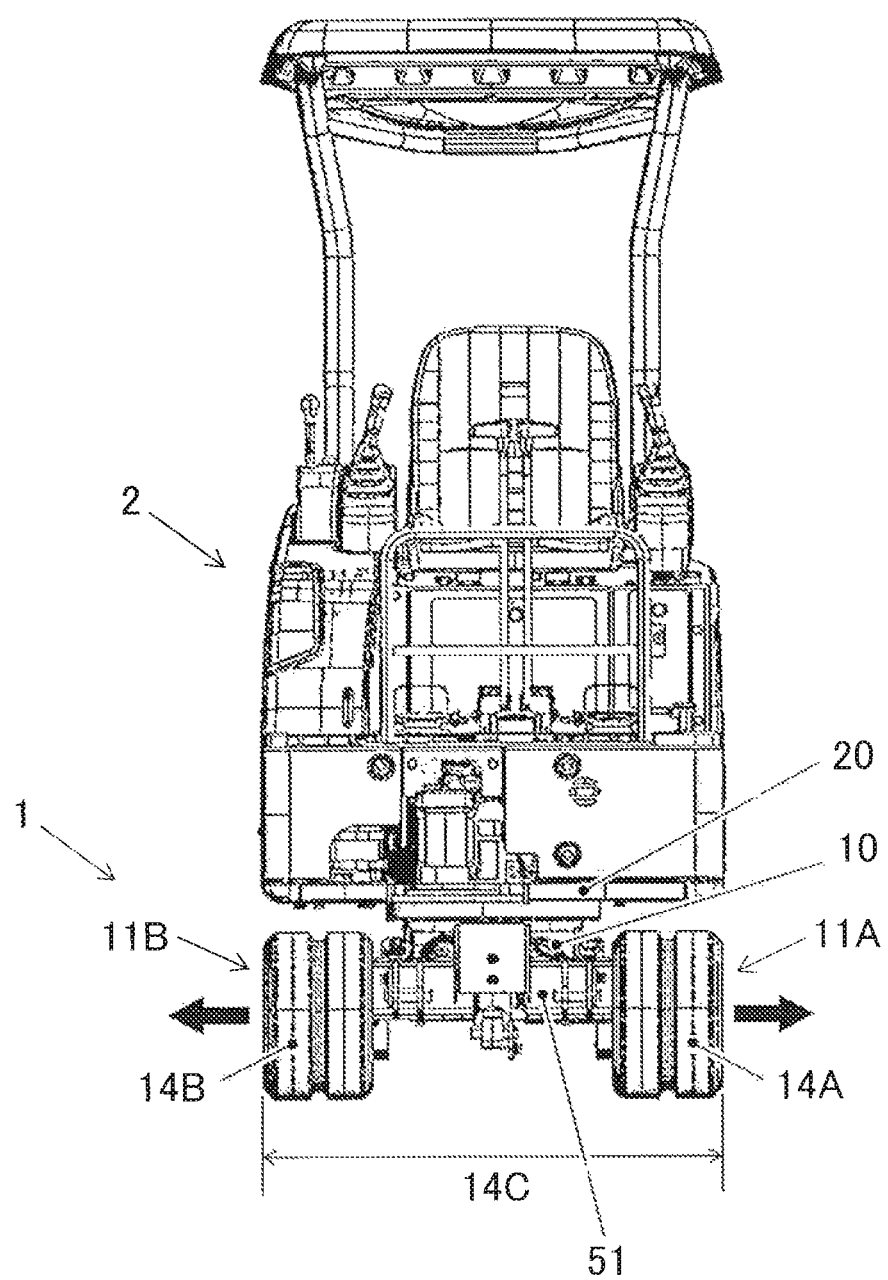
FIG. 3 is a front view of the hydraulic excavator, with the work implement and the blade omitted.

FIG. 3 is a front view of the hydraulic excavator, with the work implement and the blade omitted. The center frame 10 includes a vehicle width changing device 51 on its lower section, and the left and right track devices 11A and 11B is mounted across the center frame 10 via the vehicle width changing device 51. The lower track structure 1 is constructed so as to enable the vehicle width 14C to be changed by operating the vehicle width changing device 51. Extending the vehicle width 14C enables working stability of the machine body to be improved, and narrowing down the vehicle width 14C enables the vehicle to travel through confined spaces such as an alley, and to be loaded and carried on a mini-truck.

Figure 4:
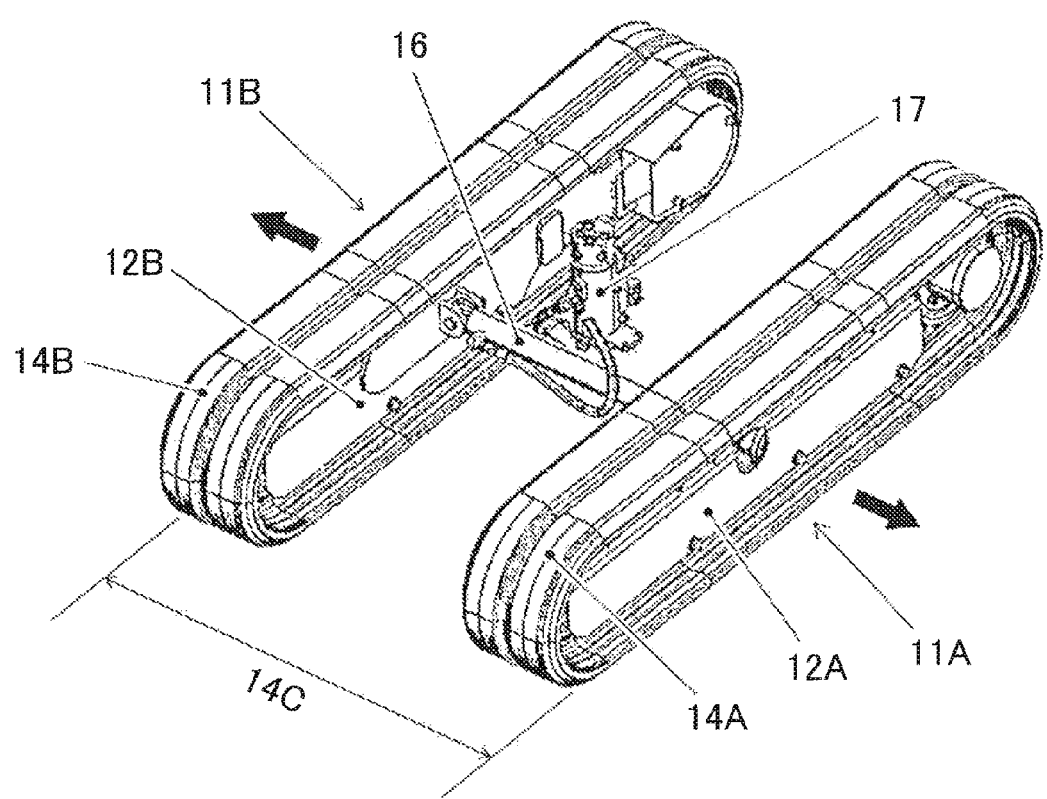
FIG. 4 is an external view showing left and right crawler track devices and a portion of a vehicle width changing device.

FIG. 4 is an external view showing the left and right track devices and a portion of the vehicle width changing device. The vehicle width changing device 51 (see FIG. 3) is mounted around left and right sideframes 12A and 12B, and includes a hydraulic cylinder 16 that can be extended and retracted in a lateral direction of the vehicle (this hydraulic cylinder is hereinafter referred to as the vehicle width changing cylinder). The vehicle width changing cylinder 16 has its hydraulic-fluid supply and discharge ports connected to a center joint 17 via hydraulic hosing and further connected to a vehicle width changing control valve 42a (see FIG. 5) of the control valve unit 42 via the center joint 17. The vehicle width changing device 51 includes, across the vehicle width changing cylinder 16, a guide mechanism that guides the extension and retraction of the left and right track devices 11A and 11B during a change of the vehicle width, the mechanism being omitted in FIG. 4.

Figure 5:
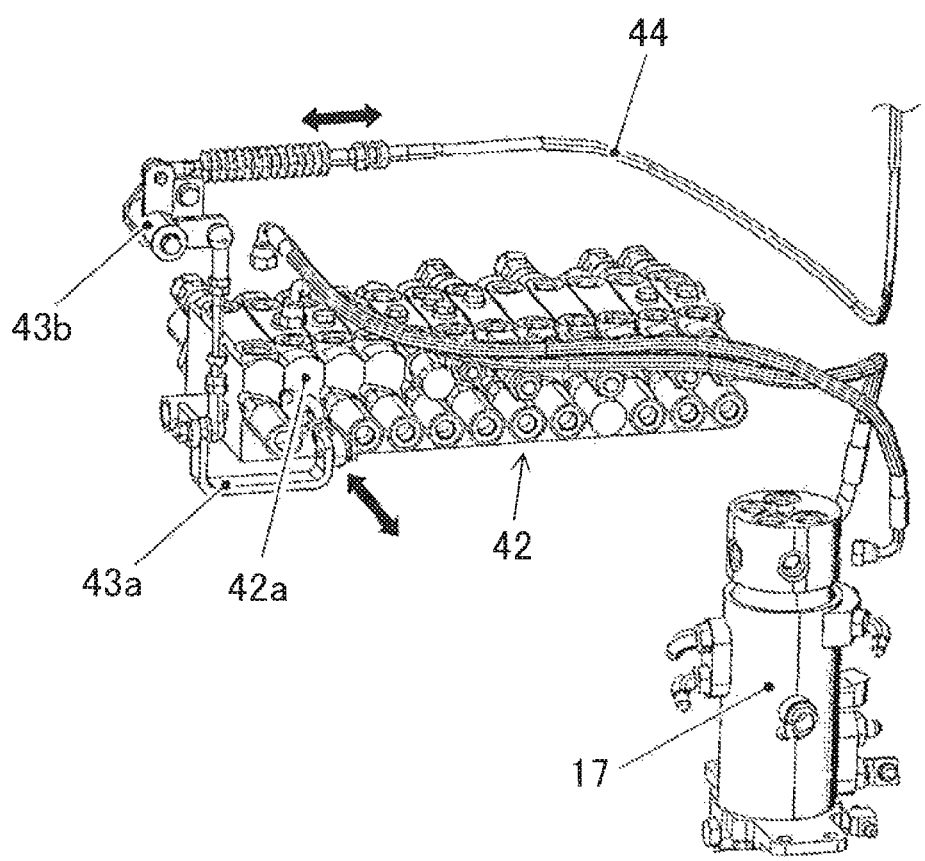
FIG. 5 is an external view showing a control valve unit and a center joint.

FIG. 5 is an external view showing the control valve unit and the center joint. The control valve unit 42 includes a plurality of control valves that control the directions and flow rates of the hydraulic fluid supplied from the hydraulic pump not shown, to the plurality of actuators including the track motor 13A (see FIG. 2), and the vehicle width changing control valve 42a is one of those control valves. The hydraulic-fluid supply and discharge ports of the vehicle width changing control valve 42a are connected to the center joint 17 via hydraulic hosing and further connected to the vehicle width changing cylinder 16 via the hydraulic hosing shown in FIG. 4. In addition, the vehicle width changing control valve 42a is a mechanically operated control valve, and its operating section is coupled to a cable 44 via linkage mechanisms 43a and 43b. The cable 44 is routed through the swing body support structure 50 (see FIG. 1) and connected to the vehicle width changing control lever 34 (see FIG. 6 or 7). Operating the vehicle width changing control lever 34 causes the cable 44 to be pushed or pulled, which then causes the vehicle width changing control valve 42a to be correspondingly switched. This controls the direction and flow rate of the hydraulic fluid supplied to the vehicle width changing cylinder 16 (see FIG. 4), and thus enables the vehicle width 14C to be changed.

Figure 6:
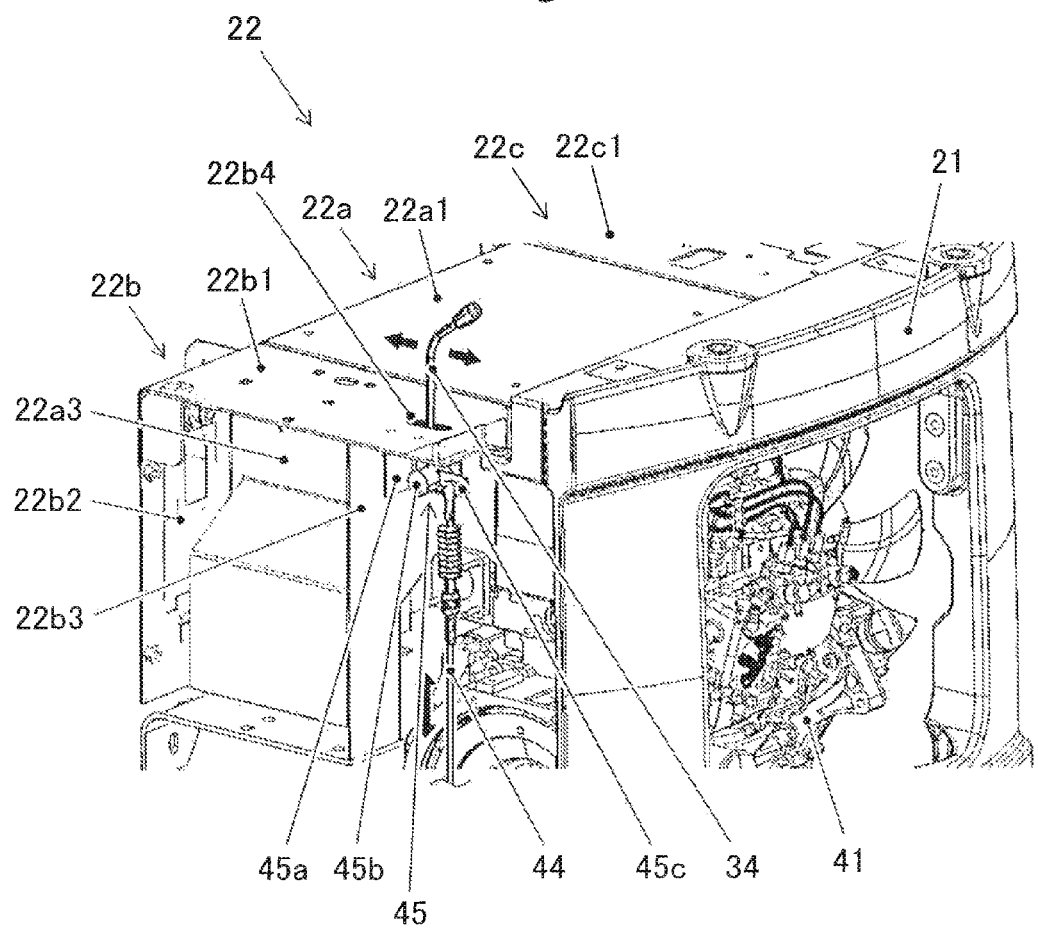
FIG. 6 is a perspective view of a seat base, with an outer cover, an operator's seat, a lever locking device, and the like removed.
Figure 7:
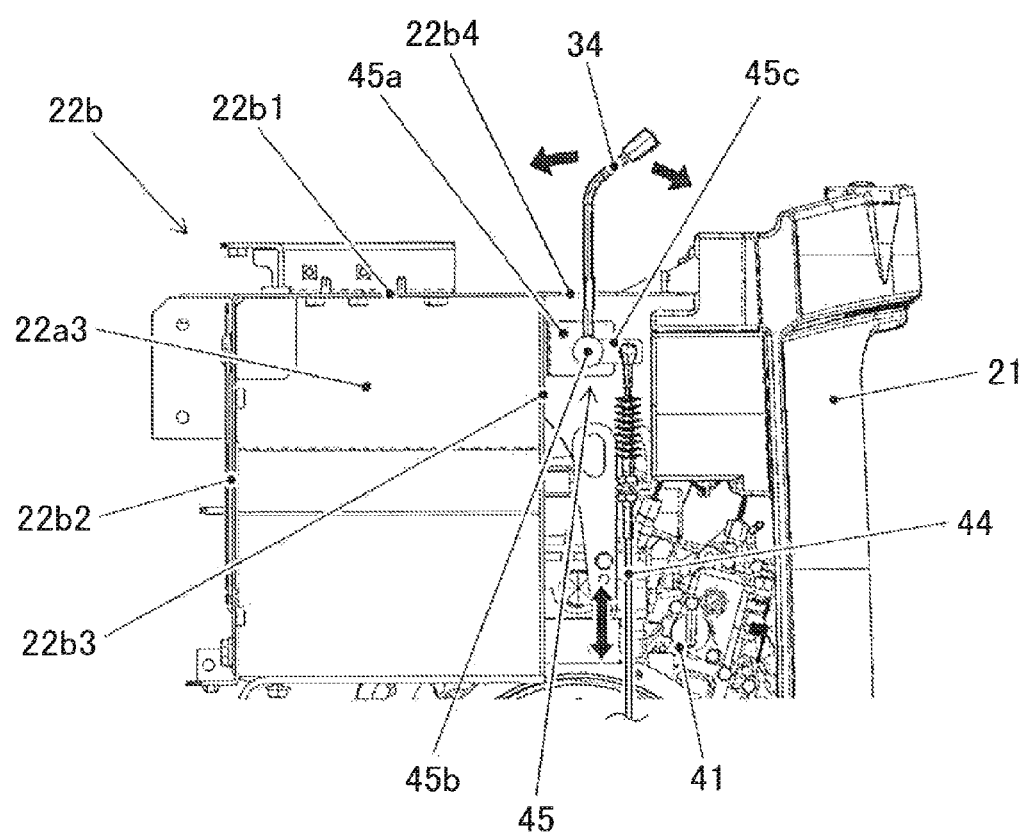
FIG. 7 is a side view of the seat base, with the outer cover, the operator's seat, the lever locking device, and the like removed.

FIGS. 6 and 7 are a perspective view and side view, respectively, of the seat base, with the outer cover, the operator's seat, the lever locking device, and the like removed. As shown in FIG. 6, the seat base 22 includes a middle seatbase portion 22a on which the operator's seat 23 is placed, a left seatbase portion 22b located to the left of the middle seatbase portion 22a and on which portion the left control lever device 32A is arranged, and a right seatbase portion 22c located to the right of the middle seatbase portion 22a and on which portion the right control lever device 32B and the blade-lifting lever 33 are arranged. The seatbase portions 22a, 22b, and 22c include the upper panels 22a1, 22b1, and 22c1 and the front panels 22b2 (only the front panel at the left is shown), the middle seatbase portion 22a includes left and right sidewalls 22a3 (only the left sidewall is shown) for further separating an internal region of the seat base 22 from the left and right seatbase portions 22b and 22c, and the left seatbase portion 22b includes a partition wall 22b3 that further splits the internal region of the seat base 22 vertically.

As shown in FIGS. 6 and 7, the vehicle width changing control lever 34 extends downward through an elongated lever hole 22b4 formed in the upper panel 22b1 of the left seatbase portion 22b, and the lever 34 is coupled at its lower end to a pivoting section 45b of a linkage mechanism 45 mounted at one end thereof on the partition wall 22b3 of the left seatbase portion 22b via a bracket 45a. The linkage mechanism 45 includes an arm 45c formed integrally with the pivoting section 45b, and the arm 45c is connected to the cable 44. Forward or backward tilting of the vehicle width changing control lever 34 causes the cable 44 to be pushed or pulled, and thus as described above, the vehicle width changing control valve 42a is switched, thereby the vehicle width 14C is changed.

Figure 8:
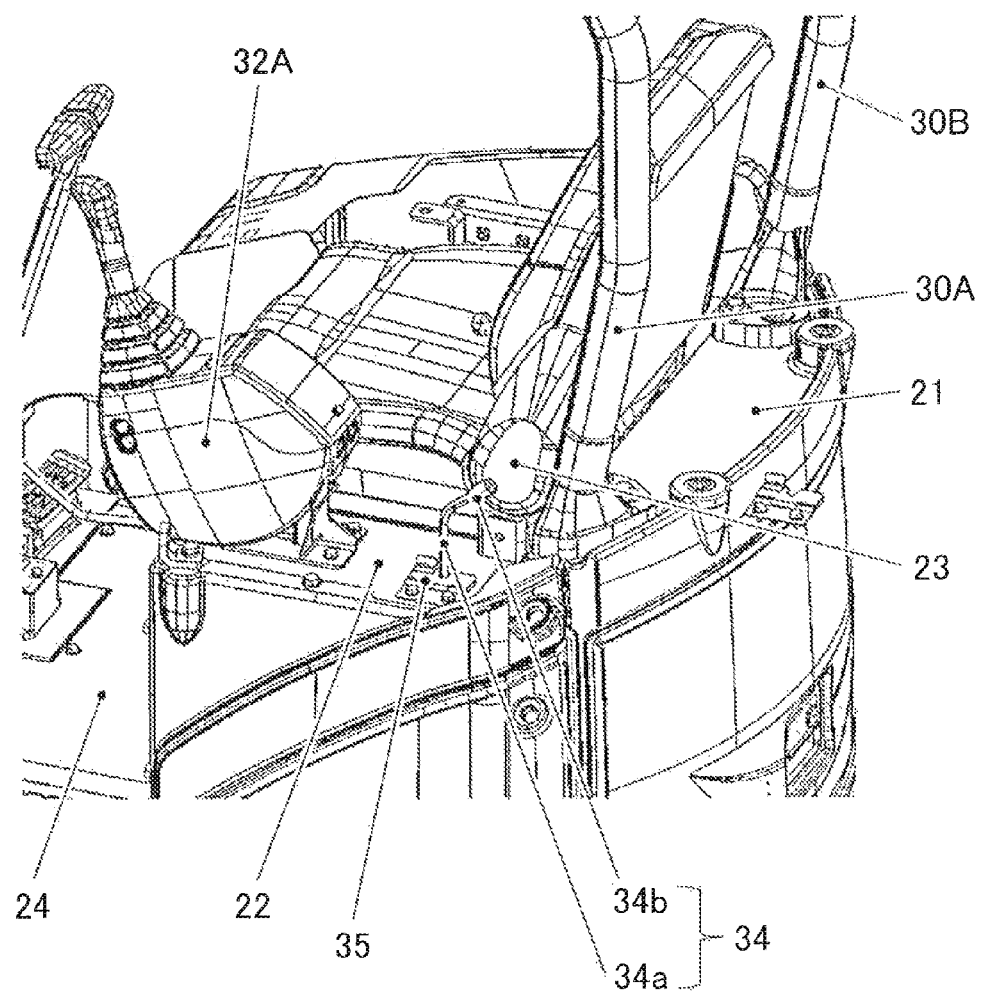
FIG. 8 is a perspective view of the operator's seat section as viewed from a rear left section of the machine body.
Figure 9:
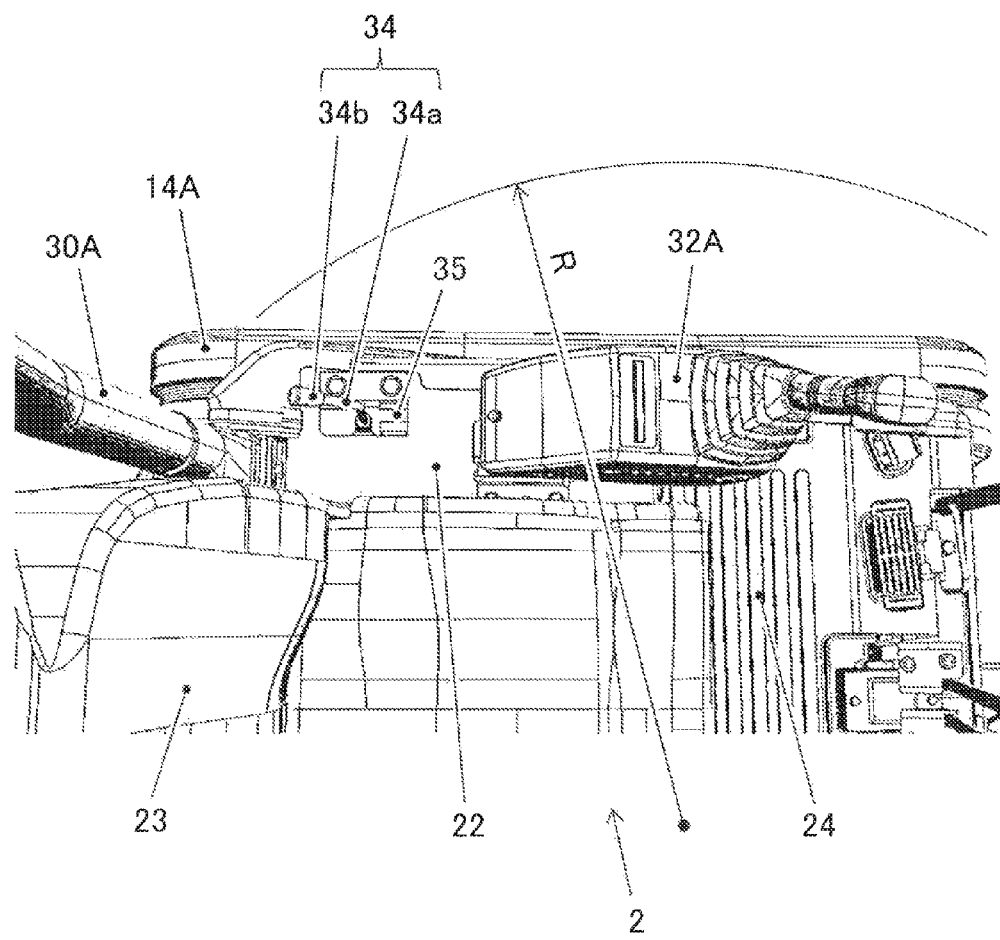
FIG. 9 is a top view of a left section of the operator's seat.
Figure 10:
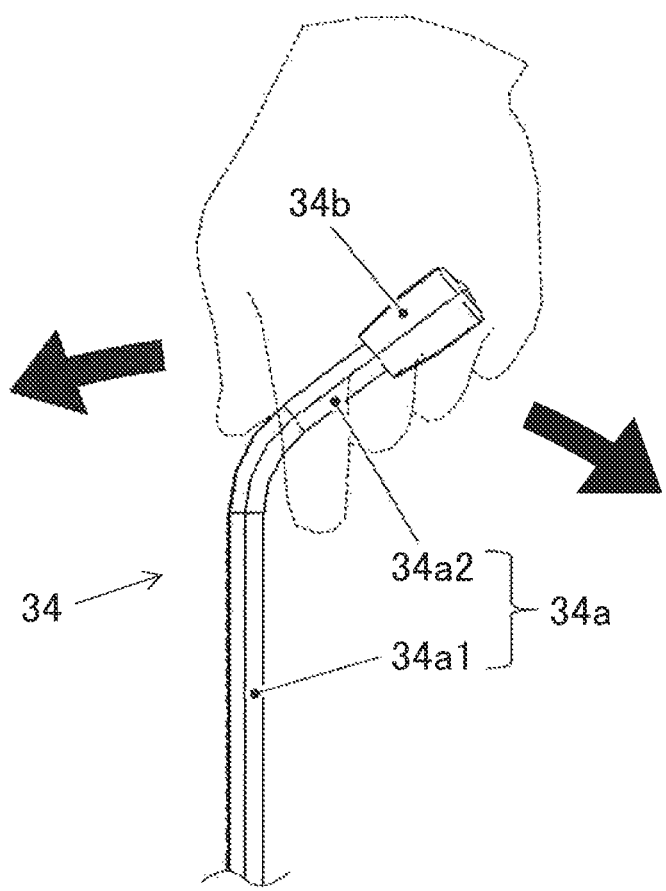
FIG. 10 is an enlarged side view of a section of the vehicle width changing control lever that is projected above a lever hole.

FIG. 8 is a perspective view of the operator's seat section as viewed from a rear left section of the machine body, and FIG. 9 is a top view of a left section of the operator's seat. FIG. 10 is an enlarged side view of a section of the vehicle width changing control lever that is projected above the lever hole 22b4. As shown in FIGS. 8 and 9, the vehicle width changing control lever 34 is disposed posterior to the left control lever device 32A on the seat base 22 and anterior to the left pillar 30A (i.e., between the left control lever device 32A and the left pillar 30A). The vehicle width changing control lever 34 includes, as shown in FIG. 10, a lever section 34a and a grip section 34b mounted at a distal end of the lever section 34a, and as shown in FIGS. 6 and 7, the lever section 34a is mounted at one end thereof on the pivoting section 45b of the linkage mechanism 45 so as to be tiltable back and forth with respect to the seat base 22. The lever section 34a includes a lever body 34a1 and the distal end 34a2 at which the grip section 34b is mounted, and the distal end 34a2 is bent backward with respect to the lever body 34a1. A dotted line in FIG. 10 denotes the operator's hand gripping the grip section 34b. Since the distal end 34a2 is bent backward with respect to the lever body 34a1, it can be seen in FIG. 9 that when the vehicle width changing control lever 34 is tilted forward, the operator's hand gripping the grip section 34b neither oversteps swing radius R nor interferes with the left control lever device 32A located at forward. Furthermore, since the vehicle width changing control lever 34 is disposed to the left of the left pillar 30A, when the vehicle width changing control lever 34 is tilted backward, the operator's hand gripping the grip section 34b neither oversteps swing radius R nor interferes with the left pillar 30A located at rear.

Figure 11:
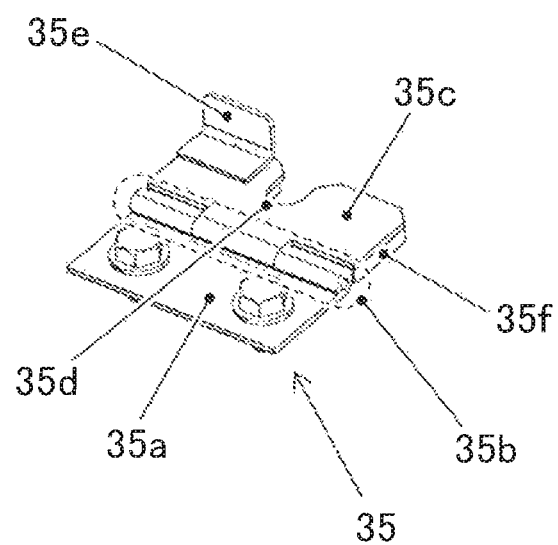
FIG. 11 is a perspective view of the lever locking device.

FIG. 11 is a perspective view of the lever locking device. As shown in FIG. 11, the lever locking device 35 is a double-level hinged section, including a mounting plate 35a fixed to an edge of the lever hole 22b4 (see FIG. 13) via bolts and/or the like, and a movable plate 35c connected to the mounting plate 35a via a hinge 35b so as to be turnable between a horizontally tilted position and raised position. A notched recess 35d for engaging the lever section 34a (see FIG. 10) of the vehicle width changing control lever 34 is formed at an edge of the movable plate 35c. A bent member 35e (holding section) of a plate-shaped form is connected to the edge of the movable plate 35c by welding. A flexible sealing member 35f, which is also of a plate-shaped form, is mounted on a face of the movable plate 35c, the face adapted to face the lever hole 22b4.

Figure 12:
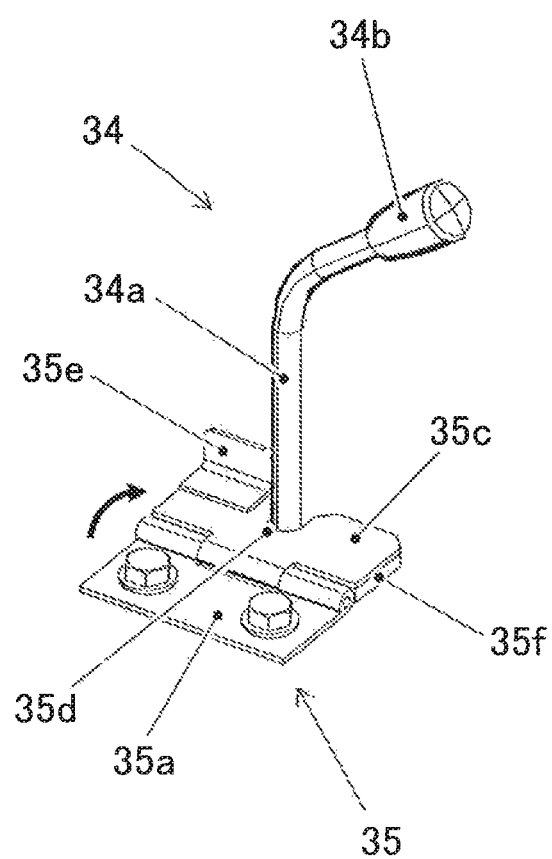
FIG. 12 is a perspective view showing the lever locking device together with the vehicle width changing control lever locked therein.

FIG. 12 is a perspective view showing the lever locking device together with the vehicle width changing control lever locked therein. As shown in FIG. 12, turning the movable plate 35c to its horizontally tilted position, at which position the movable plate 35c covers the lever hole 22b4, causes the notched recess 35d of the movable plate 35c to firmly engage the lever section 34a of the vehicle width changing control lever 34, thus enabling the vehicle width changing control lever 34 to be locked. At this time, the lever hole 22b4 (see FIG. 13) can be covered with the movable plate 35c. Additionally, a clearance between the movable plate 35c and an outer edge of the lever hole 22b4 can be filled in with the sealing member 35f. Since the lever hole 22b4 communicates with the engine compartment, the sealing member 35f is preferably a highly heat-resistant member such as a rubber sheet.

Figure 13:
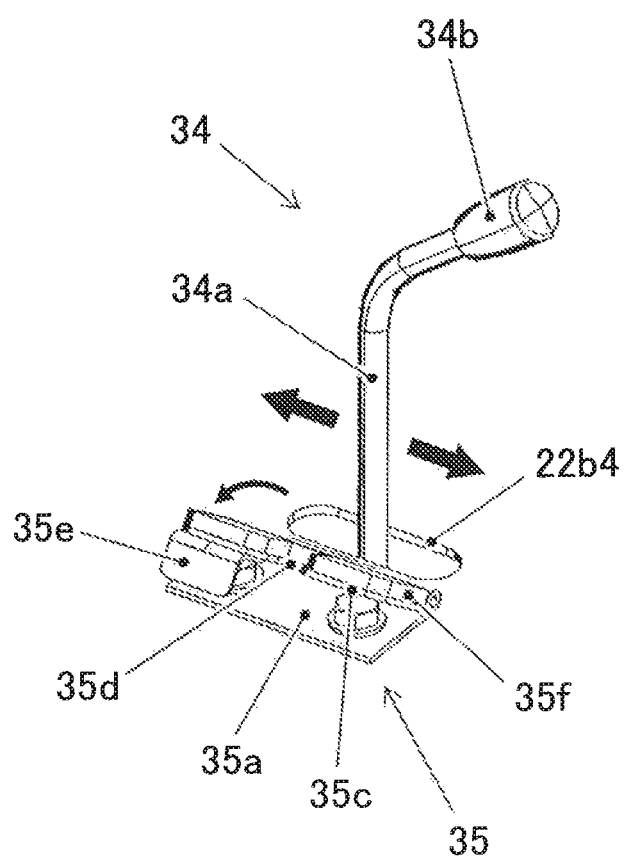
FIG. 13 is a perspective view showing the lever locking device together with the vehicle width changing control lever unlocked therefrom.

FIG. 13 is a perspective view showing the lever locking device together with the vehicle width changing control lever unlocked therefrom. As shown in FIG. 13, turning the movable plate 35c to its raised position, at which position the movable plate 35c releases the lever hole 22b4, enables the notched recess 35d (see FIG. 12) to be dislodged from the vehicle width changing control lever 34, thus enabling the vehicle width changing control lever 34 to be unlocked.

Effects

The following describes advantageous effects that the hydraulic excavator of the above configuration yields in the present embodiment as compared with a conventional hydraulic excavator.

First, the hydraulic excavator of the present embodiment is, for example, a rear ultrasmall-swing machine, and rear ultrasmall-swing machines, unlike standard machines of a large machine-body tail radius, usually have a fuel tank and a hydraulic fluid tank arranged on a front right side of the machine body because of a limited device-layout space. This tank arrangement may reduce visibility of the machine undercarriage (crawlers) as viewed from the right side of an operator's seat.

In such a rear ultrasmall-swing machine, if a function of a vehicle width changing control lever is added to a blade-lifting lever disposed to the right of the operator's seat as in a currently commercialized hydraulic excavator, an operator has difficulty visually confirming the positions of the crawlers while operating the vehicle width changing control lever, and hence has some trouble in adjusting the vehicle width.

Figure 14:
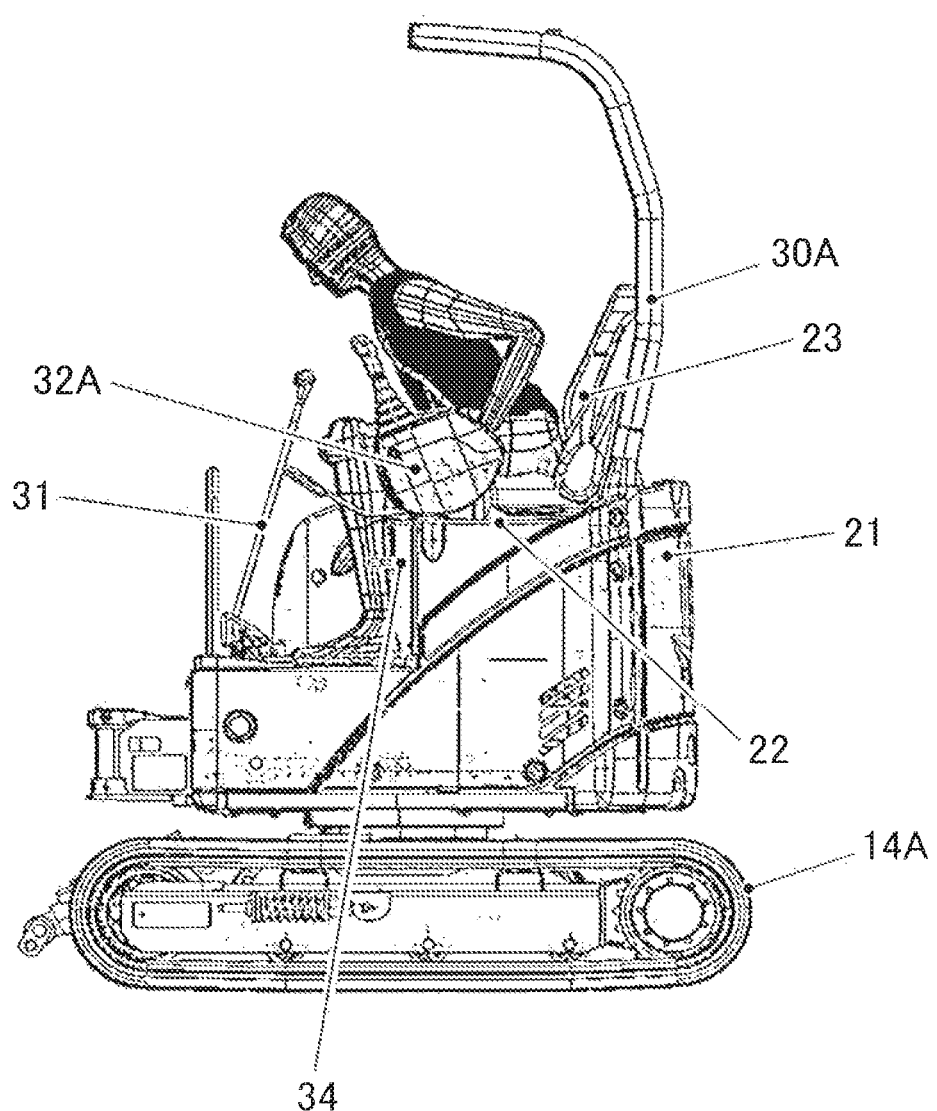
FIG. 14 shows a conventional hydraulic excavator together with an operator seated on an operator's seat, the hydraulic excavator being a rear ultrasmall-swing machine to which the art described in JP-2000-198471-A is applied to dispose a vehicle width changing control lever disposed at a lower section of the operator's seat.

In JP-2000-198471-A, the vehicle width changing control lever is disposed on the front side of the seat base under the operator's seat. FIG. 14 shows a conventional hydraulic excavator together with an operator seated on an operator's seat, the hydraulic excavator being a rear ultrasmall-swing machine to which the art described in JP-2000-198471-A is applied to dispose a vehicle width changing control lever disposed at a lower section of the operator's seat. In the hydraulic excavator of FIG. 14, since the vehicle width changing control lever 34 is disposed on the front side of the seat base 22 under the operator's seat 23, the operator would need to bend forward to operate the vehicle width changing control lever 34. In this case, the operator has difficulty visually confirming the positions of the left and right crawlers 14A and 14B, and hence has some trouble in adjusting the vehicle width. In addition, if as in JP-2000-198471-A, a special operating lever for changing the vehicle width is disposed on a compact hydraulic excavator of a limited device-mounting space, part of the operator's body (i.e., in a case of JP-2000-198471-A, the operator's foot or leg) is liable to come into accidental contact with the vehicle width changing control lever during normal work not requiring the operation of the vehicle width changing control lever, thus causing the vehicle width to be changed contrary to the operator's intention.

Figure 15:
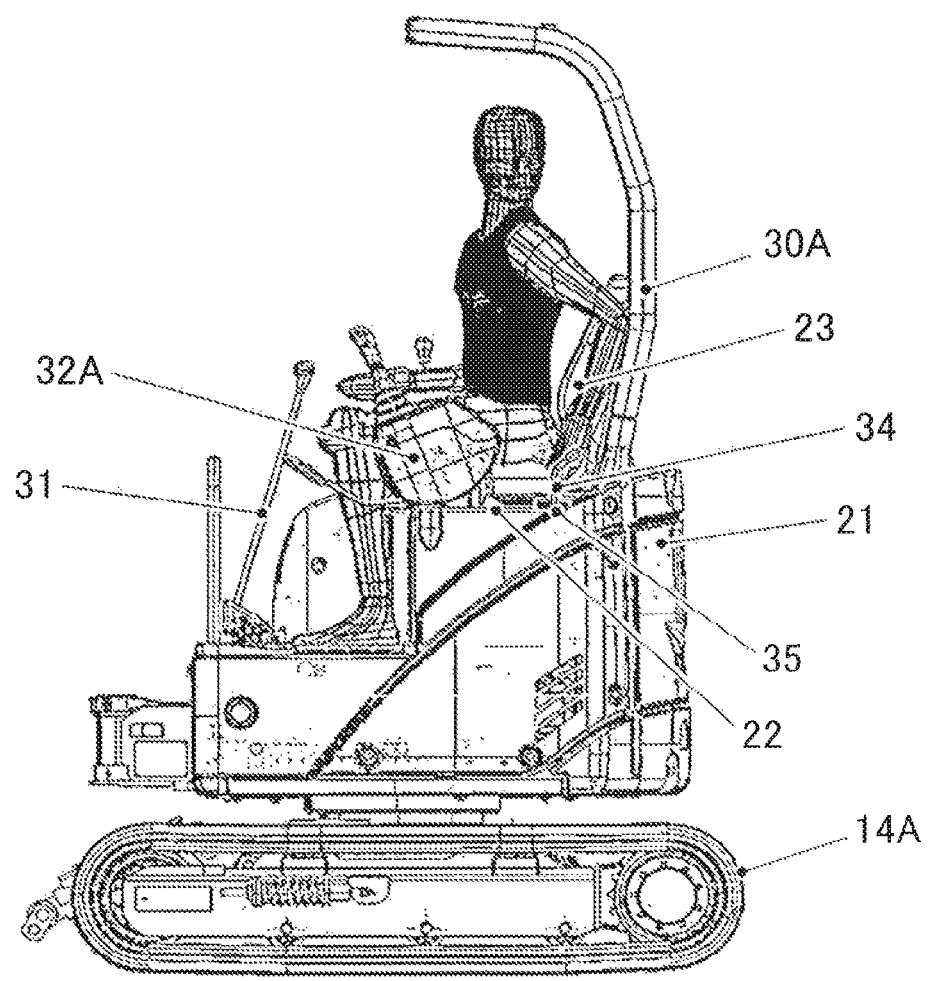
FIG. 15 shows the hydraulic excavator of the present embodiment together with an operator seated on an operator's seat.

FIG. 15 shows the hydraulic excavator of the present embodiment together with the operator seated on the operator's seat. In the hydraulic excavator of the present embodiment, the vehicle width changing control lever 34 is disposed on the section of the swing body support structure 50 that is located to the left of the operator's seat 23. This makes it easy to adjust the vehicle width 14c. This is because, even when the construction machine is restricted in visibility of the machine undercarriage (the left and right crawlers 14A and 14B) as with a rear ultrasmall-swing machine, the operator can operate the vehicle width changing control lever 34 while visually confirming the positions of the left and right crawlers 14A and 14B, by taking a look at a readily visible section of the swing body support structure 50 that is located to the left of the operator's seat 23.

Additionally, even if the left control lever device 32A is arranged on a left front section of the seat base 22 relative to the operator's seat 23, the vehicle width changing control lever 34 can be disposed at a left section of the swing body support structure 50 relative to the operator's seat 23. As described above, therefore, it becomes easy for the operator to operate the vehicle width changing control lever 34 while visually confirming the positions of the left and right crawlers 14A and 14B, and thereby adjust the vehicle width 14c easily.

Furthermore, even when the construction machine is designed to have an extremely small swing radius R as with a rear ultrasmall-swing machine, and the vehicle width changing control lever 34 is surrounded with the left control lever device 32A or any other parts restricting a zone in which the vehicle width changing control lever 34 is adapted to move, the operator's hand gripping the grip section 34b during tilting operations on the vehicle width changing control lever 34 neither oversteps the swing radius R nor interferes with the surrounding parts, which leads to improved operability of the vehicle width changing control lever 34.

Furthermore, since the lever locking device 35 that locks the vehicle width changing control lever 34 is disposed, during normal work not requiring the operation of the vehicle width changing control lever 34, accidental operation of the vehicle width changing control lever 34 can be prevented by locking it with the lever locking device 35.

Furthermore, since the lever locking device 35 includes the holding section 35e disposed so as to rise from the movable plate 35c, the movable plate 35c can be turned via the holding section 35e and the operator can lock and unlock the vehicle width changing control lever 34 smoothly.

Moreover, when the vehicle width changing control lever 34 is locked, the lever hole 22b4 can be covered with the movable plate 35c, hot air inside the engine compartment can be prevented from blowing out from the lever hole 22b4, and rainwater and the like can be prevented from entering the engine compartment from the lever hole 22b4. In consequence, a seating environment on the operator's seat 23 can be maintained comfortable while an operating environment for the devices placed in the engine compartment can be kept in good condition.

Besides, when the vehicle width changing control lever 34 is locked, the clearance between the movable plate 35c and the outer edge of the lever hole 22b4 can be filled in with the sealing member 35f, which enhances the above effects.

Modifications

The present invention is not limited to/by the above embodiment and may be modified into the following forms.

1. In the present embodiment, the vehicle width changing control lever 34 is disposed at the left seatbase portion 22b on which the left control lever device 32A is arranged. The present invention, however, is not limited to/by this configuration. For example, the left and right control lever devices 32A and 32B may be arranged on a front section of the floor panel 24, and if the hydraulic excavator does not include the left seatbase portion 22b, the vehicle width changing control lever 34 may be disposed at a left section of any other structural member of the swing body support structure 50 with respect to the operator's seat 23.

2. In the present embodiment, the machine includes the twin-pillar canopy 30. The present invention, however, is not limited to/by this configuration. For example, the machine may include a single-pillar or triple-pillar canopy.

3. In the present embodiment, as shown in FIGS. 5, 6, and 7, the operating section of the vehicle width changing control valve 42a and the vehicle width changing control lever 34 are coupled to one another via the linkage mechanisms 43a and 43b and the cable 44. The present invention, however, is not limited to/by this configuration. For example, if a distance between the control valve unit 42 and the vehicle width changing control lever 34 is short enough, the coupling may be accomplished only via linkage mechanisms.

Figure 16:
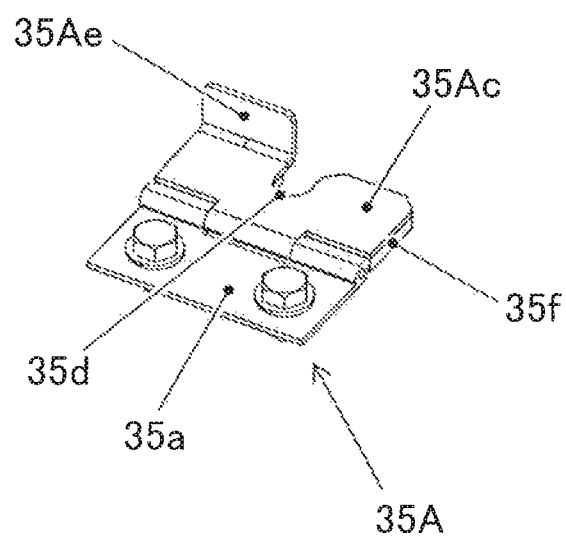
FIG. 16 is a perspective view showing a modification of the lever locking device.
Figure 17:
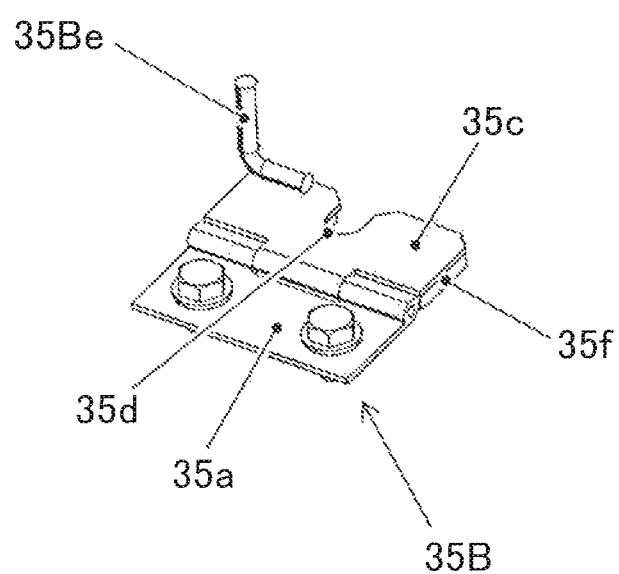
FIG. 17 is a perspective view showing another modification of the lever locking device.

4. In the present embodiment, the holding section 35e is formed by welding the bent member of a plate-shaped form to the movable plate 35c. Alternatively, for example, as shown in FIG. 16, a holding section 35Ae may be formed by bending an edge of a movable plate 35Ac, or as shown in FIG. 17, a holding section 35Be may be formed by welding a bent rod-shaped member onto the movable plate 35c.

5. In the present embodiment, the mounting plate 35a and the movable plate 35c are coupled to one another so as to form a double-level hinged section having the sealing member 35f on a lower surface of the movable plate 35c. Alternatively, the mounting plate 35a and the movable plate 35c may be coupled so as to form a plain/flush hinged section not having the sealing member 35f on the lower surface of the movable plate 35c.

6. In the present embodiment, the vehicle width changing control lever 34 is disposed at the left seatbase portion 22b on which the left control lever device 32A is arranged. Alternatively, for example, if the left and right control lever devices 32A and 32B are arranged on the front section of the floor panel 24 and the hydraulic excavator does not include the left seatbase portion 22b, the vehicle width changing control lever 34 may be disposed at the left section of any other structural member of the swing body support structure 50 with respect to the operator's seat 23.

7. In the present embodiment, the machine includes the twin-pillar canopy 30. Alternatively, for example, the machine may include a single-pillar or triple-pillar canopy.

8. In the present embodiment, as shown in FIGS. 5, 6, and 7, the operating section of the vehicle width changing control valve 42a and the vehicle width changing control lever 34 are coupled to one another via the linkage mechanisms 43a and 43b and the cable 44. Alternatively, for example, if the distance between the control valve unit 42 and the vehicle width changing control lever 34 is short enough, the coupling may be accomplished only via linkage mechanisms.

What is claimed is:

1. A construction machine comprising:
    a lower track structure whose left and right crawler track devices are adapted to change in spatial interval;
    an upper swing structure swingably mounted above the lower track structure, the upper swing structure including;
        a swing frame that forms a support structure,
        a counterweight disposed at a rear section of the swing frame,
        a seat base supported by the swing frame, disposed at a front side of the counterweight, and forming a swing body support structure in combination with the swing frame,
        an operator's seat placed on the seat base, and
        a floor panel positioned at a front side of the seat base and the operator's seat and forming an operator's accessway, and
        left and right control lever devices arranged respectively to the left and right of the operator's seat on the seat base, wherein the construction machine is configured as a rear ultrasmall-swing machine in which the seat base is disposed so as to shroud devices including an engine and a hydraulic pump, and on a front right side of the swing frame a fuel tank and a hydraulic fluid tank are arranged and that the back end of the counterweight is positioned anterior to the back end of the lower track structure,
    a hydraulically actuated cylinder for changing vehicle width, disposed between the left and right crawler track devices, the vehicle width changing cylinder changing the interval between the left and right crawler track devices upon supply and discharge of a hydraulic fluid being controlled by a vehicle width changing control valve, and
    a vehicle width changing control lever for operating the vehicle width changing control valve, wherein
    the seat base includes a left seat base portion on which the left control lever device is arranged, a right seat base portion on which the right control lever device is arranged, and a middle seat base portion that is placed therebetween and on which the operator's seat is arranged, and an outer peripheral of the left seat base portion is shrouded with an outer cover,
    the middle seat base portion includes left and right sidewalls for further separating an internal region of the seat base from the left and right seat base portions, and the left seat base portion includes a partition wall that further splits the internal region of the seat base vertically, and
    the left seat base portion has an upper panel that has a back-and-forth elongated lever hole formed at a rear section of the left control lever device, and
    the vehicle width changing control lever is configured to extend downward through the back-and-forth elongated lever hole and to be coupled at its lower end to a pivoting section of a linkage mechanism mounted at one end thereof on the partition wall of the left seat base portion via a bracket.

2. The construction machine according to claim 1, wherein the vehicle width changing control lever includes a lever section mounted on the swing body support structure and adapted to tilt back and forth, and a grip section mounted at a distal end of the lever section,
    the lever section is bent backward at the distal end where the grip section is mounted, and
    the vehicle width changing control lever is disposed at a rear section of the left control lever device such that it does not overstep the swing radius of the upper swing structure.

3. The construction machine according to claim 1, further comprising:
    a lever locking device that locks the vehicle width changing control lever at its neutral position,
    wherein the vehicle width changing control lever includes a lever section mounted tiltably back and forth on the swing body support structure, and a grip section mounted at an upper end of the lever section,
    the swing body support structure includes an upper panel at where the vehicle width changing control lever is disposed, the upper panel being formed with a back-and-forth elongated lever hole into which the lever section is inserted and encompassing a region in which the vehicle width changing control lever is adapted to move,
    the lever locking device includes a movable plate mounted on the upper panel via a hinge and adapted to turn between a horizontally tilted position and a raised position, the movable plate being formed with a notched recess at an edge opposite to the hinge, and
    the movable plate, when in the horizontally tilted position, locks the lever section by covering the lever hole and engaging the lever section in the notched recess, and when in the raised position, unlocks the lever section by uncovering the lever hole and releasing the lever section from the notched recess.

4. The construction machine according to claim 3, wherein the lever locking device further includes, at the edge of the movable plate where the notched recess is formed, a holding section disposed so as to rise from the movable plate.

5. The construction machine according to claim 3, wherein the lever locking device further includes a flexible, plate-shaped sealing member on a face of the movable plate, the face adapted to face the lever hole.

6. The construction machine according to claim 4, wherein the lever locking device further includes a flexible, plate-shaped sealing member on a face of the movable plate, the face adapted to face the lever hole.

* * * * *